United States Patent
Nielsen et al.

(10) Patent No.: US 9,244,506 B2
(45) Date of Patent: Jan. 26, 2016

(54) METHOD OF CONTROLLING A POWER PLANT

(71) Applicants: Kaj Skov Nielsen, Issaquah, WA (US); Michael Stoettrup, Herning (DK)

(72) Inventors: Kaj Skov Nielsen, Issaquah, WA (US); Michael Stoettrup, Herning (DK)

(73) Assignee: SIEMENS AKTIENGESELLSCHAFT, München (DE)

( * ) Notice: Subject to any disclaimer, the term of this patent is extended or adjusted under 35 U.S.C. 154(b) by 519 days.

(21) Appl. No.: 13/678,962

(22) Filed: Nov. 16, 2012

(65) Prior Publication Data

US 2014/0142771 A1    May 22, 2014

(51) Int. Cl.
| | |
|---|---|
| *G05D 3/12* | (2006.01) |
| *G06F 1/26* | (2006.01) |
| *H02J 3/32* | (2006.01) |
| *H02J 3/38* | (2006.01) |
| *H02J 7/34* | (2006.01) |

(52) U.S. Cl.
CPC ... *G06F 1/26* (2013.01); *H02J 3/32* (2013.01); *H02J 3/382* (2013.01); *H02J 7/34* (2013.01); *Y02E 70/30* (2013.01)

(58) Field of Classification Search
CPC .............. G06F 1/26; H02J 7/34; H02J 3/382; H02J 3/32; Y02E 70/30
USPC .......................... 700/271, 286, 291, 296, 297
See application file for complete search history.

(56) References Cited

U.S. PATENT DOCUMENTS

| | | | |
|---|---|---|---|
| 4,320,306 A * | 3/1982 | Kohga et al. ................ 307/51 |
| 5,831,843 A * | 11/1998 | Lindberg et al. ............ 363/41 |
| 5,917,718 A * | 6/1999 | Palsson et al. .............. 363/35 |
| 7,505,833 B2 * | 3/2009 | Delmerico et al. ......... 700/291 |
| 8,498,832 B2 * | 7/2013 | Venkatasubramanian ... 702/65 |
| 8,977,402 B2 * | 3/2015 | Garcia ........................ 700/287 |
| 9,070,173 B2 * | 6/2015 | Forbes, Jr. |
| 2002/0087234 A1 * | 7/2002 | Lof et al. .................... 700/286 |
| 2002/0169523 A1 * | 11/2002 | Ross et al. .................. 700/286 |
| 2004/0075343 A1 * | 4/2004 | Wareham et al. ........... 307/39 |
| 2005/0015283 A1 * | 1/2005 | Iino et al. .................... 705/4 |
| 2008/0195255 A1 * | 8/2008 | Lutze et al. ................. 700/291 |
| 2008/0252076 A1 * | 10/2008 | Fortmann et al. ........... 290/44 |
| 2010/0161147 A1 * | 6/2010 | Adam ......................... 700/291 |
| 2010/0204844 A1 * | 8/2010 | Rettger et al. ............... 700/291 |
| 2010/0262314 A1 * | 10/2010 | Gale et al. ................... 700/295 |
| 2011/0148114 A1 * | 6/2011 | Garcia ......................... 290/44 |
| 2011/0178646 A1 * | 7/2011 | Haj-Maharsi et al. ...... 700/287 |
| 2011/0313591 A1 * | 12/2011 | Andresen et al. ........... 700/298 |
| 2012/0053750 A1 * | 3/2012 | Viassolo et al. ............. 700/297 |
| 2012/0072039 A1 * | 3/2012 | Anderson et al. ........... 700/291 |
| 2012/0147637 A1 * | 6/2012 | Petter ........................... 363/74 |

(Continued)

*Primary Examiner* — Crystal J Barnes-Bullock
*Assistant Examiner* — Thomas Stevens

(57) ABSTRACT

A method of controlling a power plant connected at a point of connection to an electricity grid is provided. The power plant includes a power production facility connected to a power storage facility. The method includes determining a reactive power grid demand and/or voltage grid demand of the electricity grid, obtaining operating data for the power plant facilities, computing reactive power and/or voltage references for the power plant facilities on the basis of the grid demands and the operating data, and operating the power plant facilities on the basis of the references such that a net reactive power and/or a net voltage at the point of connection fulfills a grid demand. A plant controller for controlling a power plant is also provided. A power plant including power production facilities connected to power storage facilities, and the plant controller using the method is also provided.

13 Claims, 3 Drawing Sheets

(56) References Cited

U.S. PATENT DOCUMENTS

2013/0345884 A1* 12/2013 Forbes, Jr. .................... 700/286
2013/0346768 A1* 12/2013 Forbes, Jr. .................... 713/310
2014/0225370 A1* 8/2014 Mayer et al. .................... 290/44
2015/0178700 A1* 6/2015 Forbes, Jr. .................... 705/40

* cited by examiner

METHOD OF CONTROLLING A POWER PLANT

FIELD OF INVENTION

A method of controlling a power plant, a power plant controller, and a power plant are provided.

BACKGROUND OF INVENTION

A grid operator or balancing authority may determine the base amount of active power that power producing facilities such as fossil plants, hydro plants or wind power plants may be allowed to produce at any specific time, i.e. the amount of power required by customers supplied by the grid, and issue appropriate references to any power plant that feeds into the grid. Such power plants are generally characterized by their ability to regulate the real or active power within some dynamic range depending on various factors such as environmental conditions, the number of power production units up and running, the type of technology used by the power plant, etc. The active power response rate and the reactive power response rate of a power plant also depend on the plant type. The proportions of active power and reactive power that are required from the power plants may vary according to the load on the grid and the grid voltage. Conventional power producing plants—in which power is not generated from "renewable" energy sources—can increase or decrease their power output as necessary and can respond to the momentary demand situation. In the case of power production plants that produce or generate electricity using renewable energy sources such as wind energy or solar energy, the amount of power that can be output depends to some extent on the environmental situation, for example the strength of the wind in the case of a wind power plant; or the time of day and extent of cloud cover in the case of a photovoltaic power plant.

Reactive power is injected or extracted from the power network in order to control the grid voltage. Conventional power networks, comprising only power production plants that feed into the electricity grid, generally comprise some means of absorbing and generating reactive power, and the amount of reactive power that is absorbed or released is governed by the grid operator. Reactive power is the imaginary component of the power vector. Reactive power is absorbed or generated (released) by different components or elements of a power production facility, such as shunt capacitors, shunt reactors, etc., and these must be controlled precisely since the flow of reactive power in the power production facility influences the voltage levels at the point of connection between the power production facility and the electricity grid. Renewable power plants that use state of the art power electronics are capable of supplying reactive power control directly from an inverter only using reactors or capacitors as supplemental components whenever the grid needs additional reactive capability.

The amount of power generated by a power production facility is regulated or managed by a plant operator, which ensures that the power fed from a power plant into the grid fulfils the grid requirements at all times. A conventional power plant controller can be designed to operate with a local operator-controlled voltage or reactive power reference (also referred to in the following as an "MVAr reference"), or it can be configured to operate with a remote controlled voltage or MVAr reference issued by the grid operator or transmission operator. As indicated above, the ability of a renewable power plant to respond to grid demands—whether for active or reactive power—is limited by its dependency on the current or momentary environmental conditions.

SUMMARY OF INVENTION

It is therefore an object to provide an improved way of operating a power plant.

This object is achieved by the method of controlling a power plant, by the plant controller, and by the power plant of the claims.

The method of controlling a power plant—connected at a point of connection to an electricity grid and comprising at least one power production facility connected to at least one power storage facility—comprises receiving or obtaining a reactive power grid demand and/or voltage grid demand of the electricity grid; obtaining operating data for the power plant facilities; computing reactive power and/or voltage references for the power plant facilities on the basis of the grid demands and the operating data; and operating the power plant facilities on the basis of the references such that a net reactive power and/or a net voltage at the point of connection satisfies the grid demands in order to fulfill the relevant grid requirements.

The power storage facilities are connected to the power production facilities, which is to be understood to mean that energy output by a power production facility can be transferred in some manner to one or more of the power storage facilities. Energy transfer can take place over the electricity grid, or a power storage facility may be directly fed by a power production facility, effectively bypassing the electricity grid.

An advantage of the method is that not only power production facilities but also power storage facilities can be collectively controlled so that the potential of each facility to contribute to a reactive power and/or voltage requirement can be fully exploited.

Since renewable power plants such as wind parks can only regulate their output within the constraints of the energy available in the wind, the accuracy of a forecast that takes into account how many turbines might be stopped due to service, or how many turbines might have lower production due to wear on some component waiting to be exchanged etc., determines how far in advance a plant operator can realise the available regulation range. The method can overcome this disadvantage, since the integration of power storage—even only to a limited extent—into a wind power plant or a solar power plant will significantly increase the regulation capability of such plants and further increase the power plant's ability to offer ancillary services such as voltage support or low voltage ride-through to the grid operators.

The plant controller for controlling a power plant—connected to an electricity grid at a point of connection and having at least one power production facility connected to at least one power storage facility—comprises a grid monitoring unit for determining a reactive power grid demand and/or a voltage grid demand of the electricity grid; a facility monitoring unit for obtaining operating data of the power plant facilities; a reference computation unit for computing reactive power and/or voltage references for the power plant facilities on the basis of the grid demands and the operating data; and a distribution unit for distributing the references to the power plant facilities such that the facilities operate to fulfill grid requirements at the point of connection.

An advantage of the plant controller is that control of the power storage facilities and control of the power production facilities can be combined in such a way that each of these facilities can contribute, according to its capability, to the reactive power and the voltage at the grid connection point or "point of common connection", usually abbreviated as PCC. This also allows the power storage facilities and power production facilities to be used to their optimum capacity. By computing "customized" references for each of the power facilities, these can always be operated to ensure that the power plant as a whole provides the required levels of reactive power and/or voltage at the point of common connection, as specified by the grid demands given or communicated to the plant controller.

The power plant comprises a number of power production facilities connected to a number of power storage facilities, and the power plant is realised for connection to an electricity grid at a point of connection and comprises plant controller for controlling the power plant using the method.

An advantage of the power plant is that it can control any number of power production facilities and any number of power storage facilities, while these power facilities can be of any type or nature. The different or varying production capabilities of power production facilities can be optimally combined with the different or varying storage capabilities of power storage facilities at any one instant, while always satisfying reactive power and/or voltage requirements of the grid at the power plant's point of connection. By incorporating power storage facilities into the power plant, a plant controller can offer better voltage or reactive power support than prior-art power plants that do not incorporate power storage facilities. Another advantage of the power plant is that the power production facilities and the power storage facilities need not be located geographically close to each other.

Particularly advantageous embodiments and features are given by the dependent claims, as revealed in the following description. Features of different claim categories may be combined as appropriate to give further embodiments not described herein.

The arrangement of interconnected power production facilities and power storage facilities are to be understood to collectively comprise a "power plant". As indicated above, for geographically separate power facilities, energy transfer between a power production facility and a power storage facility of the power plant can take place over the grid, so that the power plant can be regarded as a "virtual" plant. Even if the facilities are geographically remote from each other, they can be collectively controlled by the plant controller. Therefore, in the following, the terms "power plant", "virtual power plant", "collective power plant", "combined power plant" and "aggregate power plant" can have the same meaning and may be used interchangeably. Connection points of the facilities of the power plant to the grid can be collectively regarded as a "single" point of connection, which can also be referred to as a "virtual", "combined" or "aggregate" point of connection.

Preferably, the facilities of the power plant according to the network are connected to the plant controller over a suitable communications network. Such a connection allows controllers of geographically separate facility arrangements to exchange data, for example storage capacities of storage facilities, which data can be used in determining the references or setpoints for the power facilities, as will be explained below.

A power production facility is typically used to generate power that is fed into the electricity grid for consumption. Some of the generated power can be transferred—as required—to a power storage facility. Therefore, in the following, the term "power facility" can refer to a power production facility or a power storage facility.

A "facility" can comprise a single unit or it may comprise a number of units. For example, a power production facility such as a wind park can comprise any number of power generating units, in this case wind turbines. Equally, a power storage facility can comprise a plurality of storage units, for example a thermal energy storage plant comprising a bank of thermal energy storage units controlled by a common controller.

The power plant controller can directly manage a power facility by generating references for a controller of the power facility, for example a "park pilot" in the case of a wind park. In this case, the power plant controller preferably communicates with the controller, which in turn distributes the references to the individual units of the wind park.

A power storage facility of the power plant can be "reversible" or "non-reversible". A reversible power storage facility can output energy in the same form as it was input into the storage facility. An example of a reversible power storage facility might be a battery, which can be charged using an electrical current, and which outputs an electrical current when discharged. Another example might be a hydro-electric facility, for which electrical energy is used to pump water into a reservoir, and which outputs electricity again when the stored water is used to drive a turbine. A non-reversible power storage facility outputs energy in a different form. An example of a non-reversible power storage facility might be a synthetic natural gas facility, for which electrical energy is used to synthesize gas. The gas can be supplied directly by consumers without undergoing any further conversion.

In a power plant, a power production facility can comprise any of the group of power production facilities comprising a wind power plant; a tidal power plant; a solar power plant; any other type of power plant based on renewable energy sources; or any other type of power production facility that is capable of producing energy that can be fed into an electricity grid and/or converted for storage in a power storage plant of the power plant.

Similarly, in a power plant, a power storage facility can comprise any of the group of power storage facilities comprising a thermal storage facility; a battery storage facility; a flywheel storage facility; a compressed air storage facility; a synthetic natural gas storage facility, or any other type of power storage facility that is capable of converting electrical energy and storing it in a form from which it can later be retrieved. Preferably, a power storage facility is a reversible power storage facility that can provide some level of reactive power, whenever required, to the point of common connection.

The grid demand or grid reference is given to the reference computation unit and is used as a basis from which to compute or calculate U (voltage) or Q (reactive power) references to be sent to a storage facility or unit, a power production facility or unit, a sub-controller, etc. The reference computation unit preferably generates references that are tailored to the capabilities of the power facilities. Therefore, in a particularly preferred embodiment, the step of obtaining operating data of a power plant facility comprises obtaining up-to-date or momentary data related to the power and/or reactive power and/or voltage of that power plant facility. For example, a power production facility can report a momentary power output, a momentary reactive power output, and a momentary voltage level. Theses values can reflect the performance of the power production facility as it operates according to the reference that was most recently received and that is still applicable. In the event that the power production facility could "increase" its output, it can also report a potential power output, a potential reactive power output, and a potential voltage level. For example, a power production facility might report a momentary reactive power output of +50 MVAr, and a potential reactive power output range of +120 MVAr to −40 MVAr, signalling that is capable of increasing its export by 70 MVAr or reducing its import/export by 90 MVAr. To use this data optimally or most efficiently, the reference computation unit also preferably determines the aggregate momentary situation at the PCC. Therefore, in a further preferred embodiment, the step of obtaining operating data of the power plant facilities comprises measuring net power and/or net voltage and/or net reactive power and/or net power factor at the point of common connection of the electricity grid. Knowing the value of a net or aggregate variable, and knowing the individual contributions and potential of each power facility, the reference computation unit can compute individual references for each power facility to obtain a desired aggregate value, while exploiting the potential of each power facility. By spreading the grid demand over a plurality of power facilities, unfavourable situations can be avoided in which a power facility would be compelled to operate at its limit, or in which a grid requirement would not be fulfilled.

The reactive power of a power plant supports the local grid voltage. A grid demand might be to provide a certain amount of reactive power or to absorb a certain amount of reactive power, depending on the grid situation. In the event of a grid contingency such as a voltage drop or a fault on the grid side, it may be necessary for the power plant to provide additional reactive power for grid voltage support. Therefore, in a preferred embodiment, the method comprises the step of measuring net voltage at the or virtual point of common connection, computing voltage references for the power plant facilities, and operating the power plant facilities to obtain a desired reactive power at the point of common connection. Each power facility can then adjust its power output to provide the necessary proportion of reactive power.

Another grid demand might be to maintain a certain power factor or to adjust the power plant output to a certain power factor. A grid operator may request such an adjustment to the power factor reference during certain times of the week, for example at peak consumption times whenever large transfer of load is expected. Therefore, in a preferred embodiment, the method also comprises the step of measuring a net power factor at the point of common connection, computing power factor references for the power plant facilities, and operating the power plant facilities to obtain a desired power factor at the point of common connection (while at the same time satisfying the underlying reactive power/voltage demand). Each power facility can then adjust its reactive power output to provide the necessary power factor.

Another grid demand might be to provide a certain voltage at the point of common connection. The voltage at the PCC may vary in dependence on several factors, for example the momentary grid demand. Therefore, in a preferred embodiment, the method comprises the step of measuring net voltage at the point of common connection, computing voltage references for the power plant facilities, and operating the facilities to obtain a desired voltage at the point of common connection. Each facility can then distribute its voltage reference over any sub-units, such as individual turbines of a power plant or individual storage units of a storage facility, in order to provide the necessary aggregate or net voltage.

As indicated above, a power facility can produce and absorb reactive power. Usually, a conventional power production facility is said to export or import reactive power, depending on whether the power production facility is outputting reactive power into the grid, or absorbing reactive power from the grid. The ability of a wind power plant to import or export reactive power is limited by the network design, actual terminal voltage at each unit, the number of active or operational units and the current capability of any converters in the power plant. The ability of a storage facility such as a battery storage system to deliver reactive power does not depend on the level of battery charge, instead its reactive capability may depend on the combined active and reactive current capability of an inverter of the storage facility. Therefore, a power plant will have a collective upper limit and a collective lower limit to the amount of reactive power than can be transferred. In a power plant, each power facility will have its own upper and a lower limit. Therefore, a preferred embodiment of the control method comprises the step of monitoring a reactive power transfer—i.e. a reactive power import or a reactive power export—within the power plant relative to predefined upper and/or lower limits and performing suitable remedial measures should the reactive power tend to move beyond one of those limits. For example, as long as the reactive power transfer lies within the predefined upper and/or lower limits, the power plant facilities can be operated to obtain the desired voltage at the point of common connection. During this "voltage control" of the power facilities, the reactive power of each facility may vary. Should the situation arise in which the reactive power being transferred approaches an upper or lower limit, the power plant facilities are preferably operated to ensure that the reactive power of each facility and/or the overall power plant stays within the predefined limits. In other words, when a limit is approached, the priority shifts to deliver additional reactive power support from units that have not yet reached their limits. Preferably, the reactive power references are computed so that the desired voltage is also met, so that both grid code requirements are fulfilled.

When power is transferred over a transmission line, some transmission line losses inevitably occur. Therefore, in a further preferred embodiment, a reactive power or voltage reference for a power plant facility is computed on the basis of a physical or geographical location of the power facility in relation to the utility grid. By taking the physical plant location into account, for example by directing power facilities closer to the PCC to provide more MVAr than facilities located further away, transmission losses can be kept to a favourable minimum.

The step of computing reactive power and/or voltage references for the power plant facilities on the basis of the grid demands and the operating data amounts to determining a "facility contribution plan" for the operation of the power plant facilities. Such a facility contribution plan takes into account the grid demand that must be satisfied as well as the potential or capacity of each of the power facilities to make a contribution to satisfying a net reactive power demand or a net voltage demand.

The active power and reactive power grid requirements can fluctuate according to demand. For example, in the case of a fault such as a low-voltage fault, the power plant must be able to deliver a certain amount of active and reactive power to "ride through" the fault. Since certain types of power facility can provide active power as well as reactive power, in a particularly preferred embodiment, the power plant controller comprises a reference distributor unit for distributing active power references and reactive power references between the power facilities according to an active or "real" power component and a reactive power component of a grid requirement in response to a fault. If the power storage facilities are not constrained by charging or discharging active power, their full current capability can be used for delivering or absorbing reactive power. The central controller may prioritize reactive power support under some grid conditions at the expense of active power if low voltage ride-through is more important than ramping requirements.

Generally, a power production facility is realised and controlled to avoid transients in the case of a sudden increase or decrease in the grid voltage. Therefore, in a further preferred embodiment, the step of controlling the power facilities is implemented according to a combined voltage droop characteristic of the power facilities at the point of common connection and/or according to a combined reactive power for the power facility. In this way, the power facilities can collectively operate on a desired droop curve.

BRIEF DESCRIPTION OF THE DRAWINGS

Other objects and features will become apparent from the following detailed descriptions considered in conjunction with the accompanying drawings. It is to be understood, however, that the drawings are designed solely for the purposes of illustration and not as a definition of the limits of the invention.

In the diagrams, like numbers refer to like objects throughout. Objects in the diagrams are not necessarily drawn to scale.

DETAILED DESCRIPTION OF INVENTION

Figure 1:
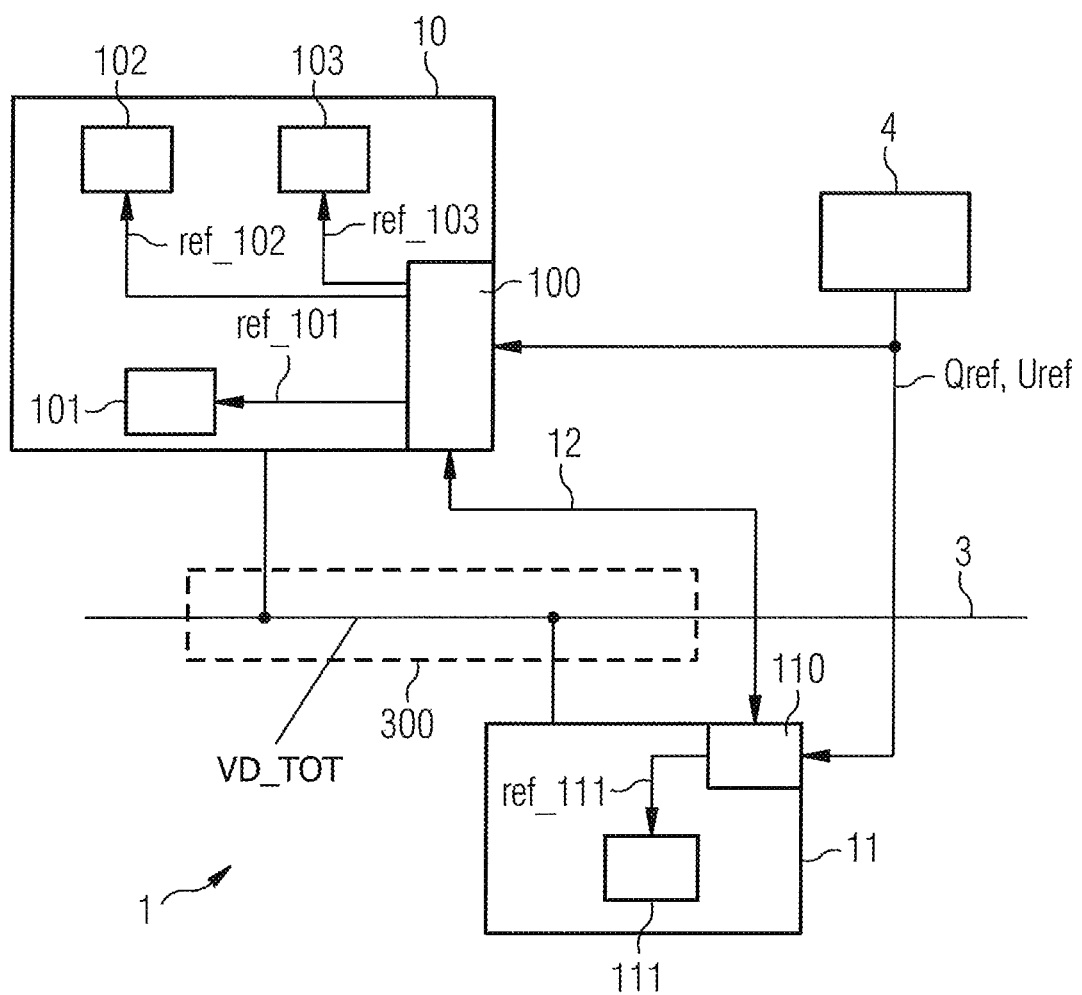
FIG. 1 shows a power plant according to an embodiment.

FIG. 1 shows a power plant 1 according to an embodiment. In this simple exemplary embodiment, the power plant 1 comprises a first arrangement 10 of power facilities with a first plant controller 100, and a second arrangement 11 of power facilities with a second plant controller 110, connected to an electricity grid 3 at a virtual or combined point of connection 300 (indicated by the broken line). The plant controllers 100, 110 are connected by means of a suitable communications network 12, so that the power facilities of the power network 1 can be controlled collectively as a "virtual" power network. A grid operator 4 or grid controller 4 (not necessarily part of the power plant 1) issues required grid values Qref, Uref that should be fulfilled at the grid.

In this embodiment, the first arrangement 10 of power facilities comprises power production facilities 101, 102 and power storage facilities 103 that are interconnected, i.e. power can be transferred between these facilities independently of the grid 3. Here, the second arrangement 11 of power facilities comprises one or more power storage facilities 111 that can be charged using power from the grid 3, and that can release power to the grid 3 as required. Since the plant controllers 100, 110 are interconnected, they can be controlled collectively to transfer power between the first and second power facility arrangements 10, 11 over the grid. This diagram only shows a very simple arrangement, and it will be noted that the power plant 1 can comprise any number of power facility arrangements, and that each power facility arrangement can comprise any number of interconnected power production facilities and power storage facilities.

In response to a grid demand values Qref, Uref issued by the grid controller 4, each plant controller 100, 110 evaluates the momentary situation regarding its power facilities. To this end, each plant controller 100, 110 is supplied with the necessary information about each facility, as will be explained with the aid of FIG. 2. Using the data supplied, each plant controller 100, 110 computes reactive power and voltage references ref_101, ref_102, ref_103, ref_111 for each of the facilities 101, 102, 103, 111. The references ensure that each facility contributes sufficiently to the overall grid demand Qref, Uref so that the power plant 1 as a whole supplies the desired amount of power to the grid 3 at the aggregate point of common connection 300. By controlling the power plant 1 using this method, the net reactive power and/or the net voltage at the combined point of common connection reach the desired values, ensuring that the power plant 1 as a whole can fulfill the relevant grid code requirements. Controlling the power facilities is implemented according to a combined voltage droop characteristic VD TOT of the power facilities at the point of common connection 300 and/or according to a combined reactive power for the power facility.

Figure 2:
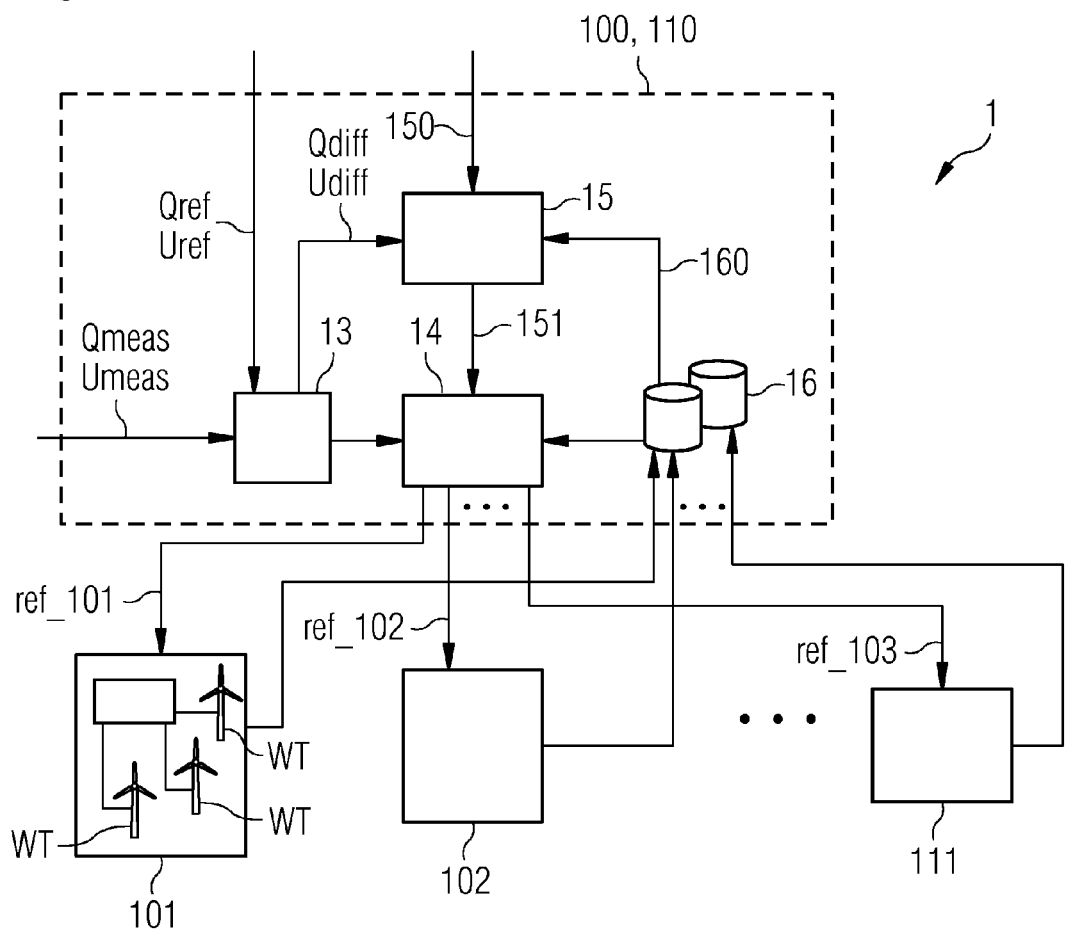
FIG. 2 shows a power plant controller according to an embodiment.

FIG. 2 shows a functional block diagram of a power plant controller 100, 110 in a power plant 1 according to an embodiment. A power plant controller 100, 110 can control a plurality of power facilities 101, 102, . . . , 111. Here, the power facilities comprise a first wind park 101 with any number of wind turbines WT, a second power production facility 102, and a power storage facility 111 such as a battery or hydroelectric station. Of course, the power plant 1 can comprise any combination of power production and power storage facilities, and is not limited to the types mentioned here. Furthermore, since the plant controllers 100, 110 are connected by a communications network and can share information, all data relevant to the operation of the power plant 1 is effectively available to each controller 100, 110, so that the functionality of more than one controller 100, 110 is shown here collectively as a single virtual controller. The combined point of connection for the power plant 1 is not shown in this diagram, but it is to be understood that the facilities 101, 102, 111 of the power plant 1 are connected to the grid in the same way or in a similar way as shown in FIG. 1, namely at a virtual or combined PCC.

The plant controller 100, 110 is supplied with various types of information: The grid demand Qref, Uref is supplied by a grid operator (not shown). This is the desired output of the plant 1, i.e. the output that is to be measured at a point of connection to the grid in order for the power plant 1 to fulfil the grid requirements. The momentary measured values Qmeas, Umeas at the point of connection are also provided. The difference Qdiff, Udiff between the desired and actual values is computed in a control unit 13. A data collection unit 16 collects relevant momentary performance data 160 from each of the facilities 101, 102, . . . , 111 such as current active power production, terminal voltage, combined with knowledge about the capabilities or capacities of the facilities. A computation module 15 receives the momentary performance data 160, and the difference values Qdiff, Udiff. With this information, the computation module 15 determines an optimal facility contribution plan 151 for the transfer of reactive power between the power facilities 101, 102, . . . , 111 in order to maintain the plant's output to the grid at the given operation point as specified by the grid demand. The facility contribution plan 151 is used by a distribution unit 14 to compute references ref_101, ref_102, . . . , ref_111 for the individual contribution to reactive power and/or voltage of each of the power facilities 101, 102, . . . , 111. In the case of a power production facility such as a wind park 101, a park pilot can distribute or divide the reference ref_101 among the turbines WT of the wind park by computing individual references for the turbines WT, making use of knowledge specific to that wind park 101, for example the placement of each turbine WT in the wind park, the number of active wind turbines or the number of wind turbines available for reactive power regulation, etc. Similarly, a power storage facility could comprise a plurality of storage devices such as batteries, and a facility controller could convert the input reference ref_111 to individual references for each of the storage devices.

By computing the references ref_101, ref_102, . . . , ref_111 in consideration of all relevant input information in this manner, the grid requirements can be met at a combined point of connection 300 for the power plant 1, while at the same time an optimal operation of each facility 101, 102, . . . , 111 in consideration of important factors such as the combined voltage level as well as the voltage level or terminal voltage of individual facilities, or the transmission loss inside the virtual plant, etc.

Figure 3:
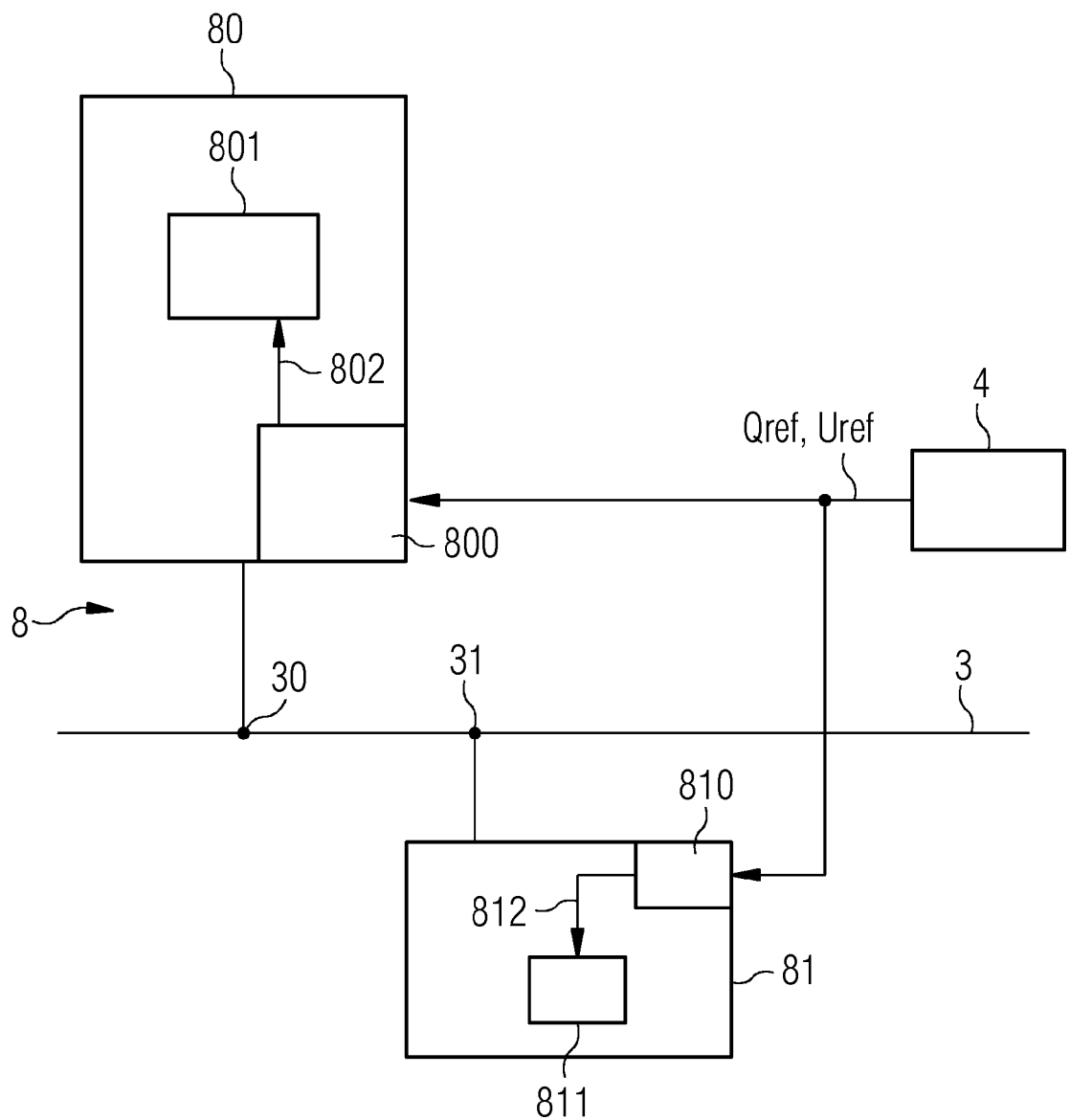
FIG. 3 shows a prior art arrangement of power plants connected to an electricity grid.

FIG. 3 shows a prior art arrangement of a power network 8 comprising power plants 80, 81 connected to an electricity grid 3. Here, the power plants 80, 81 are connected to the grid 3 at independent points of connection 30, 31. A grid controller 300 (not necessarily part of the power network 8) monitors the situation on the grid 3 and issues, among others, values for a required grid voltage Uref and/or a required grid reactive power Qref. Each power plant 80, 81 comprises a plant controller 800, 810 that converts the supplied grid demand values Uref, Qref into suitable references 802, 812 that control the output of a power production facility 801, 811. The power plants 80, 81 feed power into the grid 3 according to the extent that they are capable of fulfilling the grid demands Uref, Qref. However, the ability of a power plant 80, 81 to supply or absorb reactive power may be limited, so that such a power plant 80, 81 effectively acting on its own may often fail to fulfil a grid demand Uref, Qref.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements. The mention of a "unit" or a "module" does not preclude the use of more than one unit or module.

We claim:

1. A method of controlling a power plant connected at a point of connection to an electricity grid, comprising: providing the power plant including a power production facility connected to a power storage facility; determining a reactive power grid demand and/or voltage grid demand of the electricity grid; obtaining operating data for the power production facility and the power storage facility comprising measuring net reactive power at a point of connection or measuring net reactive power and net power and/or net voltage and/or net power factor at a point of connection; computing reactive power references or reactive power references and voltage references for the power production facility and the power storage facility on a basis of the grid demands and the operating data: operating the power production facility and the power storage facility on the basis of the references such that a net reactive power or a net reactive power and a net voltage at a point of connection fulfills one or more grid demands.

2. The method according to claim 1, wherein the obtaining operating data comprises obtaining data related to the power and/or reactive power and/or voltage of that power production facility or the power storage facility.

3. The method according to claim 1, further comprising determining a net power factor at the point of connection, computing power factor references for the power production facility and power storage facility, and operating the power production facility and the power storage facility to obtain a desired net power factor at the point of connection.

4. The method according to claim 1, further comprising determining a net voltage at the point of connection, computing voltage references for the power production facility and the power storage facility, and operating the power production facility and the power storage facility to obtain a desired net voltage at the point of connection.

5. The method according to claim 4, further comprising monitoring a reactive power transfer within the power plant relative to predefined upper and/or lower limits.

6. The method according to claim 5, wherein the power production facility and power storage facility are operated to obtain the desired voltage at the point of connection while the reactive power transfer lies within the upper and/or lower limits.

7. The method according to claim 1, further comprising determining a facility contribution plan for the operation of the power production facility and power storage facility on the basis of a reactive capability of the power production facility and/or power storage facility and a production capacity of the power production facility and/or the power storage facility.

8. The method according to claim 1, wherein a reactive power or voltage reference for a power production facility and/or a power storage facility is computed on the basis of a physical or geographical location of the power production facility and/or power storage facility in relation to the electricity grid.

9. The method according to claim 1, wherein the power production facility and power storage facility are operated according to their ability to provide active and/or reactive power in response to a grid fault.

10. The method according to claim 1, wherein controlling the power plant is implemented on the basis of a combined droop at the point of connection and/or on the basis of local droop at the power production facility and power storage facility.

11. A plant controller for controlling a power plant connected to an electricity grid at a point of connection, wherein power plant includes a power production facility connected to a power storage facility, the plant controller comprising:
an input means for determining a reactive power grid demand and/or voltage grid demand of the electricity grid;
a data collection means for obtaining operating data of the power production facility and the power storage facility;
a computation means for computing reactive power and/or voltage references for the power production facility and the power storage facility on a basis of grid demands and the operating data; and
a distribution unit for distributing the references to the power production facility and the power storage facility such that the power production facility and the power storage facility operate to fulfill grid demands at the point of connection.

12. A power plant, comprising: a plurality of power production facilities connected to a plurality of power storage facilities, wherein the power plant is realised for connection to an electricity grid at a point of connection and comprises a plant controller according to claim 11 for controlling the power production facility and the power storage facility of the power plant using a method, comprising, providing the power plant including the power production facility connected to the power storage facility; determining a reactive power grid demand and/or voltage grid demand of the electricity grid; obtaining operating data for the power production facility and the power storage facility; computing reactive power and/or voltage references for the power production facility and the power storage facility on the basis of the grid demands and the operating data; and operating the power production facility and the power storage facility on the basis of the references such that a net reactive power and/or a net voltage at a point of connection fulfills one of more grid demands.

13. The power plant according to claim 12,
wherein a power production facility is selected from the group of power production facilities consisting of a wind power plant, a tidal power plant, and a solar power plant, and
wherein a power storage facility is selected from the group of power storage facilities consisting of a thermal storage facility, a battery storage facility, a flywheel storage facility, a compressed air storage facility and a synthetic natural gas storage facility.

* * * * *